United States Patent Office 3,565,934
Patented Feb. 23, 1971

---

3,565,934
DIAZADISILETIDINES AND THE PREPARATION THEREOF
Walter Fink, Zurich, Switzerland, assignor to Monsanto Company, St. Louis, Mo., a corporation of Delaware
No Drawing. Continuation-in-part of applications Ser. No. 268,463, Mar. 27, 1963, and Ser. No. 351,202, Mar. 11, 1964. This application Sept. 10, 1964, Ser. No. 395,593
Int. Cl. C07f 7/02
U.S. Cl. 260—448.2        20 Claims

ABSTRACT OF THE DISCLOSURE

Heterocyclic 4-membered ring compounds of the formula

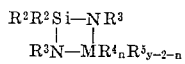

where M is silicon, boron, phosphorus, phosphorus oxide, phasphorus sulfide and metals which are at least divalent, process for preparing by reacting a dialkali or di-Grignard salt of a compound of formula $R^3NHSiR^1R^2NHR^3$ with a compound of formula

where X is an acid residue, and a cyclodisilazane process comprising heating a compound of the formula

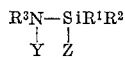

at a temperature sufficient to split off YZ and form the cyclodisilazane. These compounds are useful as high temperature fluids.

---

This application is a continuation-in-part of copending applications Ser. No. 268,463, filed Mar. 27, 1963 and Ser. No. 351,202, filed Mar. 11, 1964, both abandoned.

The present invention relates to a novel class of heterocyclic 4-membered ring compounds and a process of preparing same. The novel compounds have the general formula

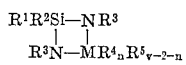

wherein the symbols possess the following significance: M is silicon, boron, phosphorus, phosphorus oxide radical (PO), phosphorus sulfide radical (PS), or a metal which is at least divalent; $R^1$, $R^2$ and $R^4$ when taken singly are organic groups joined through carbon atoms to their ring member silicon or M; moreover, $R^1$ and $R^2$ can also be halogen atoms; $R^1$ and $R^2$ when taken together form a cyclic polymethylene ring joined through their silicon atom, two $R^4$ groups when taken together form a cyclic polymethylene ring joined through M, $R^3$ is organic joined through a carbon atom to its nitrogen atom, $R^5$ taken singly is a halogen atom or the grouping

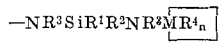

which shows at its end the same 4-membered ring as is shown above; $R^4$ and $R^5$ when taken together with M form a second 4 membered ring the same as shown above, $n$ is 0 or an integer limited by the valence of M and substituents attached to M, and $v$ is the valence of M. The compounds of the invention are especially useful as high temperature fluids due to their high thermal stability, and for this use normally it will be preferred that each of the R groups contain not more than 24 carbon atoms and for some uses not more than 8 carbon atoms.

In one method for the preparation of the 4-membered ring compounds, the di-lithium salts or Grignard derivatives of such bis(amino)-diorganosilanes are made to react with a halide of silicon, phosphorus, thiophosphorus, oxyphosphorus, boron or a metal containing at least two reactive halogen atoms. Suitable halides are e.g. $MgCl_2$, $ZnCl_2$, $BCl_3$, $AlCl_3$, $SiCl_4$, $SnCl_4$, $PCl_3$, $POCl_3$, $PSCl_3$, etc. Besides the two halogen atoms necessary for the reaction, there can be present organic substituents like hydrocarbon radicals, halogenated hydrocarbon radicals, especially fluorinated hydrocarbon radicals, such as for example, —$CF_3$, —$CH_2CF_3$, —$CF_2CF_3$, —$C_6F_5$, —$C_6H_4CF_3$, etc., and, or respectively, radicals of an alcohol or a phenol, which finally will be the substituents of the 4-membered ring. It is clear that instead of chloride, also fluorides, bromides, iodides and compounds of other acids, like sulfates, nitrates, acetates etc. can likewise be used. From the technical point of view, however, the easily accessible and more economical chlorides are preferred. This second reactant necessary for carrying out the invention can be represented by the following general formula

wherein M, $R^4$ and $v$ again are defined as before, X is a residue of an acid, preferably a halogen atom, and $m$ is a number of at least 2.

The principle of formation of a 4-membered ring may be illustrated as follows:

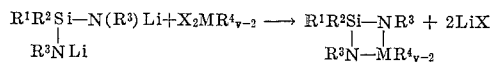

Depending on what halide is used, e.g. $X_2MR^5_{v-2}$, $X_3MR^4_{v-3}$ or $X_4M$, i.e. 2, 3 or 4 reactive halogen atoms compounds can be obtained showing one (I) or two 4-membered rings, wherein the two rings may be linked through the element M to form a spirane (II) or linked through an N-monosubstituted diorgano-bis(amino)silane group (III):

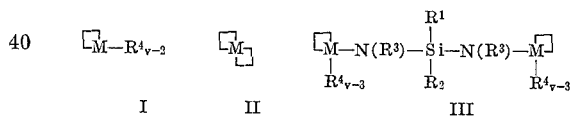

A preferred class of heterocyclic 4-membered ring compounds are the cyclodisilazanes corresponding to the formula set forth at the beginning, wherein M is silicon.

These compounds are obtained by decomposition of certain silazanes which can generally be expressed by the formula (A)

All starting compounds (A) suitable for carrying out the invention possess the same characteristic in that they contain a radical Z cleavable in the reaction and which, together with another cleavable radical or hydrogen atom Y, is released during the reaction. The radicals $R^1$ to $R^3$ are defined as before.

The formation of the cyclodisilazanes probably occurs in all cases via an unstable, intermediate silyl imide, which quickly dimerizes to the stable four-membered ring. This reaction can be schematized as follows:

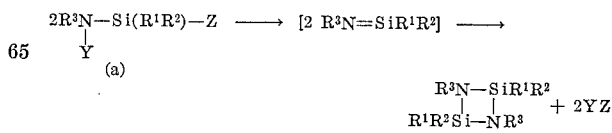

The assumption for the formation of thermally and hydrolytically stable cyclodisilazanes is, however, that at least one of the radicals $R^1$, $R^2$ or $R^3$, which are retained in the end product, possess a certain size. The steric conditions necessary for the formation of stable cyclodisilazanes are, for example, fulfilled, when attached to the nitrogen or silicon atom at least ethyl or vinyl, i.e. radicals containing at least 2 carbon atoms or preferably more carbon atoms, are present.

Three classes of starting compounds are to be considered for the instant process. The class herein preferred comprises the simple diaminosilanes, having the general formula (I)     $R^3NH—Si(R^1R^2)—NHR^3$ In this formula the groups $R^1$ to $R^3$ have the same significance as before. Although a considerable choice of the radicals $R^3$ is available, since together with the nitrogen atoms these form radicals of any primary amine, radicals are selected by reason of expediency, as will be demonstrated below.

The simplest diaminosilanes suitable herein are the symmetrical diaminosilanes which can easily be prepared in almost quantitative yield from a diorganosilicon dihalide and a primary amine in the presence of an acid binding agent at ambient or slightly elevated temperature:

$R^1R^2SiCl_2 + 2H_2NR^3 \rightarrow R^3NH—Si(R^1R^2)—NHR^3 + 2HCl$ (b)

In general, this reaction for the preparation of a preferred class of starting compounds is carried out in the presence of excess quantities of the amine being reacted. A number of symmetrically N-monosubstituted bis(amino)-diorganosilanes have been described in the technical literature. Compounds whose substituents attached to the silicon are, for example, methyl, ethyl, benzyl, phenyl, or 1-naphthyl and radicals of methylamine, ethylamine, propylamine, hexylamine, cyclohexylamine, benzylamine, or aniline, as found in the compounds bis(methylamino) - diethylsilane, bis(methylamino)-diphenylsilane, bis(ethylamino)-dimethylsilane, bis(anilino)-diethylsilane, bis(anilino) - di-1-naphthylsilane, bis(hexylamino)-diphenylsilane, bis(cyclohexylamino)-diphenylsilane, bis(benzylamino)-dibenzylsilane and others are well known. Other analogues can be prepared in exactly the same way. In the preparation of these starting compounds (I), more complex organic dichlorosilanes, such as those wherein the two groups attached to the silicon taken together from a cyclic structure as in cyclotetramethylenedichlorosilane, cyclopentamethylenedichlorosilane etc., may also be utilized instead of the simple diorganosilicon dichlorides cited above.

It has been found that on heating such starting products (I), one of the two amine radicals will be split off. With bis(methylamino)-diphenylsilane as an example, the reaction occurs according to the equation:

$2CH_3NH—Si(C_6H_5)_2—NHCH_3 \longrightarrow$ (1)

$$\begin{array}{c} CH_3N—Si(C_6H_5)_2 \\ | \quad\quad\quad | \\ (C_6H_5)_2Si—NCH_3 \end{array} + 2CH_3NH_2$$

The ease with which this reaction occurs depends on the amine radicals as well as on the organic radicals present on the silicon. The more volatile and/or basic the release amine split off, and/or the more electron-donating the organic radicals on the silicon, the faster this reaction usually proceeds. At the same reaction temperature the formation of the cyclodisilazane proceeds faster with bis(methylamino)-diethylsilane than with bis(methylamino)-diphenylsilane, and faster again with the latter than with bis(anilino)-diphenylsilane.

In order to achieve the formation of the cyclodisilazane within a reasonable time, a higher reaction temperature is needed. The convenient reaction temperature, as a rule, is at or above the boiling point of the diaminosilane employed, and is at least about 200°. The upper limit of temperature is defined by the boiling point of the cyclodisilazane or by the temperature at which decomposition of the cyclodisilazane occurs. The temperature of decomposition is high in most cases and is over 400°.

The course of reaction may be followed up by quantitative determination of the amine split off. The conversion is between 90% and 100% in all cases which have been investigated. It is supposed that the novel reaction is an equilibrium reaction, and for this reason the amine which is released has to be removed from the reaction mixture. This may be accomplished in simple manner by continuous distillation or sublimation, possibly under reduced pressure. Other known methods of elimination or inactivation of the released amine, of course, are not excluded. But the amine evolving during the reaction can be reacted with diorganodichlorosilane or cycloorganodichlorosilane such as originally employed, into the diaminosilane and then again be subjected to the reaction of invention. Use of this modification especially will be made in a continuous process.

It has been found that the mixture made in the preparation of the starting products (I) from organic silicon dichlorides and primary amines, possibly after subsequent transamination, can directly be subjected to the reaction of invention. Such a mixture contains, besides the diaminosilane, twice the equimolar quantity of amine hydrochloride which does not hinder the reaction, but rather promotes it. For this reason it has been found possible to prepare in the same batch the starting products, i.e. the diaminosilanes (I), and the end products, i.e. the cyclodisilazanes. At first, the organic silicon dichloride is converted by addition of at least a fourfold equimolar amount of the primary amine into the corresponding diaminosilane and is heated at the necessary reaction temperature, whereupon, possibly after distillation of excess amine, cyclization with evolution of amine occurs. One obtains a mixture consisting of the desired cyclodisilazane and the accompanying amine hydrochloride in a molar ratio of 1:4. At the high reaction temperatures the amine hydrochloride, as a rule, sublimes off from the reaction mixture and can be removed in this manner. Since the cyclodisilazanes are insoluble in water, the amine hydrochloride can also be separated by dissolving in water and, after addition of alkali, be recovered as free amine in known manner. This purification process is particularly advantageous with liquid cyclodisilazanes.

The manufacture of cyclodisilazanes is also possible using a continuous method by which the reactants in suitable proportions are passed through an apparatus heated at the most expedient temperature. The separation of the reaction products can also be continuously performed by distillation, sublimation and/or by a mechanical procedure such as filtration, centrifuging, etc. The free amine split off during the reaction can also be consumed, and thus, the proportion $R^1R^2SiCl_2:NHR^3$ can be 1:3.

A further well-known method to get organicdiaminosilanes of the general Formula I is based on the reaction of cyclotrisilazanes, or cyclotetrasilazanes (available from an organic silicon dichloride and ammonia), with a primary amine in a molar ratio of at least 1:6, or 1:8 respectively. This intermediate reaction can be promoted by excess amine or by means of transamination catalysts (e.g. amine salts or ammonium salts of strong inorganic acids, such as hydrochloric acid, hydrobromic acid, sulfuric acid, or strong organic acids, such as trifluoroacetic acid, etc., tertiary amines, such as trimethylamine, triethylamine, N,N,N',N'-tetramethylethylenediamine, pyridine, quinolines, quinaldines, N-alkylpyrroles, N-alkylpyrrolidines, N-alkylpiperidines, N,N'-dialkylpiperazines, N-alkyltetrahydroquinolines, N-alkyltetraisoquinolines, N-alkylmorpholines, etc.). The same is true for the final reaction or cyclization. It is within the scope of this invention to carry out the preparation of the diaminosilanes according to the method just mentioned and the conversion into cyclodisilazanes in one operation. It has also been found that this reaction proceeds faster when an electron-donating substituents, such as, an alkyl, is attached to the silicon, since these can effect a loosening of the Si—N bond.

From Equation 1 it is apparent that only one of the two amine groups present must be derived from a distillable or volatile amine. Therefore, cyclodisilazanes can also be prepared having as a ring constituent the radical of a difficultly volatile or non-volatile amine. Unsymmetrical diaminosilanes having simultaneously a radical of an easily volatile amine, e.g. methyamine, ethylamine, propylamine, iso-propylamine, butylamine, tert-butylamine, etc., besides a radical of a difficultly volatile or non-volatile amine, e.g. naphthylamine, aminobiphenyl, aminodiphenylamine, aminodiphenylether, aminodiphenylsulfide, etc. can be used for this purpose. These starting compounds containing two different amine radicals can be prepared either by a stepwise reaction of an organic dichlorosilane with two different amines, or better by transamination of a symmetrical diaminosilane in a manner which is also known.

Using the first method, a sterically hindered amine (e.g. tertiary butylamine, alpha-naphthylamine) or a weakly basic amine (e.g. aniline, aminobiphenyl, $\beta$-aminonaphthalene) is conveniently reacted at the first step, in order to avoid the formation of disubstituted symmetric products. Then, the easily volatile and, as a rule, strongly basic amine (methylamine, ethylamine, propylamine) which can more easily replace the remaining halogen atom of the organic dihalosilane, is introduced at the second step.

Using the second method for preparing unsymmetric diaminosilanes, a symmetric diaminosilane based on easily volatile amines are subjected to transamination with difficultly volatile or non-volatile amines in a molar ratio of 1:1. In the transamination, well-known facts, such as the strengtth of the Si—N bond, which is affected by the substituents on the silicon and nitrogen, as has been mentioned before, as well as steric hindrance must be considered. Since the transamination with alpha-napthylamine, as an example, proceeds extremely slowly in comparison to the beta-analogue, one may use the first method for preparing the corresponding alpha-naphthylamine derivative, i.e. the stepwise reaction of an organic silicon dihalide.

Bis(benzylamino)-dimethylsilane bis(anilino)-diphenylsilane and bis(vinyloxy-2-ethylamino)-dimethylsilane representing some symmetrical diaminosilanes which can be used herein and which possess a hydrogen atom on each nitrogen atom, are known to have been prepared by transamination. The unsymmetric analogues which have not been known before can be prepared in the same manner using half the amount of amine. They can be isolated. However, it is expedient not to isolate and to carry out the subsequent pyrolytic decomposition into the cyclodisilazane in the same batch.

The choice of amines suitable for the preparation of diaminosolanes, and thus, also of cyclodisilazanes, is very great. Regarding the amine radicals becoming a part of the cyclodisilazanes, those amines having in their hydrocarbon radical one or several substituents, such as halogen (e.g. chloroanilines, bromoanilines, fluoroanilines), nitro groups (e.g. nitronilines), cyano groups (e.g. aminobenzonitriles), carbonyl groups (e.g. aminobenzophenones), ether groups (e.g. anisidine), ester groups (e.g. aminocarboxylic esters, aminosulfonic esters, aminophosphorus esters, aminophosphonic esters), secondary and, especially tertiary amino groups (e.g. N-dialkyldiaminoalkanes, N-phenyldiaminoalkanes, N-phenyldiaminobenzenes) etc., besides simple aliphatic, cycloaliphatic, araliphatic, aromatic and heterocyclic primary amines, can also be used. It may be noted that in the aromatic compounds these substituents can be in the ortho, meta or para position with respect to the primary amino group.

Regarding the amine which is released during the reaction, a low boiling, cheap amine will be selected. This selection, however, is also directed by the boiling point of the intermediate diaminosilanes, since the reaction time can be considerably shortened at higher starting temperatures.

Particularly valuable products distinguished by their great thermal and hydrolytic stability whilst possessing the lowest melting points and simultaneously the highest boiling points, are obtained when on the nitrogen and/or silicon atom a substituent having at least a diaryl ether grouping ArOAr is present. Examples are mono- or divalent radicals derived from the following compounds: phenoxybenzene, toloxybenzene, biphenylyloxybenzene, alpha-phenoxynaphthalene, beta-phenoxynaphthalene, toloxynaphthalene, 1,4-diphenoxybenzene, 1,3-diphenoxybenzene, 1,2-diphenoxybenzene, 1,3,5-triphenoxybenzene, 1,2,3-triphenoxybenzene, 1,2,4-triphenoxybenzene etc., and radicals derived from polyaryl ethers $ArO(AnO)_nAr$ especially polyphenoxyphenylenes of the formula

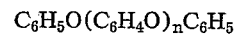

$$C_6H_5O(C_6H_4O)_nC_6H_5$$

wherein $n$ is an integer of from 1 to 10. It may again be pointed out that the aroxy groups may be in the ortho, meta or para position with respect to themselves as well as to the nitrogen or silicon atom of the cyclodisilazanes. These starting compounds can be prepared according to processes which are well known in principle. The same is true for the organic silicon dihalides containing diaryl ether groups just mentioned above and which are necessary for the preparation of the precursory diaminosilanes.

Still other, especially valuable products, many representatives of which are liquid, contain on the nitrogen atom a grouping of the formula —R'—SiR"$_3$ wherein R' is an alkylene cycloalkylene aralkylene arylene or divalent heterocyclic radical and R" is a hydrocarbon or heterocyclic radical or a group OR''', where R''' is one of the organic groups of an ether. The preparation of such compounds is best achieved by transamination of a symmetric diaminosilane with an amino compound of the formula $H_2N$—R'—SiR"$_3$. The unsymmetric diaminosilane thus formed e.g.

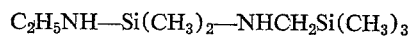

$$C_2H_5NH—Si(CH_3)_2—NHCH_2Si(CH_3)_3$$

is subjected to the thermal cleavage of amine with ensuing cyclisation. These cyclodisilazanes can also be prepared according to one of the processes described below.

A second class of silazanes which can serve for preparing cyclodisilazanes according to the principle of reaction (a), set forth above, contain as cleavable substituents Y a silyl group, and Z a halogen atom. These starting compounds may be denoted disilylamines and correspond to the general formula

(II)    $$R^6R^2R^1Si—N(R^3)—SiR^1R^2R^6$$

In this formula $R^1$, $R^2$ and $R^3$ are defined as before and $R^6$ is in principle defined similarly to $R^1$ and $R^2$, however, at least one $R^6$ is a halogen atom attached to a silicon atom.

These compounds are prepared using the same organic dichlorosilanes and primary amines which are also used in the preparation of starting compounds belonging to the first class. They can be prepared according to two different methods.

In the first method, primary amines in the form of dialkali salts or di-Grignard derivatives are reacted with at least twice a molar quantity of the organic dichlorosilane. Excess dichlorosilane, which can be recovered by distillation, promotes the formation of the disilylamines (II). This intermediate reaction proceeds even at ambient or slightly elevated temperatures. Of course, the reactivity of the organic dichlorosilanes also plays some part. Aliphatic dichlorosilanes, as an example, react more easily than aromatic ones. As a rule, the preparation of the disilylamines is carried out in a solvent, since the preparation of the alkali salts or the Grignard derivatives of the amines is performed in one. Anhydrous benzene, toluene, xylene, hexane, tetramethylurea etc. (for lithium salts), dioxane, dimethoxyethane, tetrahydrofuran etc. (for Grignard derivatives) are suitable solvents or diluents.

The cyclization to the four-membered ring proceeds with bis(dimethyl-chlorosilyl)aniline, as an example, according to the equation:

(2) $2Cl(CH_3)_2Si-N(C_6H_5)-Si(CH_3)_2Cl \longrightarrow$

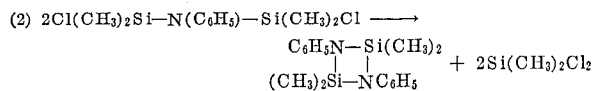
$+ 2Si(CH_3)_2Cl_2$

The expedient reaction temperature lies, as a rule, in the range of between 100° and the boiling point of the disilylamine. The diorganosilicon dichloride or cyclo-organosilicon dichloride has to be removed continuously from the reaction mixture, or to be inactivated in some way. The ease with which this reaction occurs depends partly on the strength of the Si—N bond, and partly also on the Si—Cl bond. The reaction occurs in such cases especially easily, where the substituents are aliphatic radicals (or chlorine or bromine) on the silicon, and aromatic radical on the nitrogen.

A specific method feature comprises the reaction of a primary amine in the form of a di-alkali salt or di-Grignard derivative with an organic silicon trihalide or with silicon tetrahalide. The formation of polymers can be avoided, if excess halide is used or if such halides are employed whose halogen atoms display a varied reactivity, such as $RSiCl_2F$, $SiCl_2F_2$, $SiBr_2F_2$. In this case the reaction is preferably carried out in the reverse order, i.e. the silazane salt is expediently added to the silicon halide. On reacting the dilithium salt of aniline with propyl-dichloro-fluorosilane, or dichloro-difluorosilane respectively, the following fluorine-containing cyclodisilazanes result:

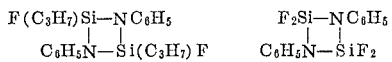

In the second method for preparing disilylamines (II), a primary amine is reacted with an organic monochlorosilane; excess amine is expediently used as an acid-binding agent. The alkali salt or Grignard derivative of this monosilylamine is subsequently prepared and reacted with an organic silicon halide or with a silicon tetrahalide. The starting compounds obtained by this way are unsymmetric disilylamines corresponding to the general Formula II, wherein the silyl groups $SiR^1R^2R^6$ are different. During the cyclization which follows the same principle (2), the corresponding organic silicon halide is released. It has to be removed from the reaction mixture or to be inactivated in some way. Polymerization can be avoided by proceeding as explained above.

For the preparation of the second class of starting compounds (II), and therefore, of cyclodisilazanes according to the second basic process (2) proposed herein, primary amines are suitable, provided both their hydrogen atoms on the nitrogen can be replaced by alkali metal or Grignard radical, and no other replaceable atoms (e.g. active hydrogen, halogen) or cleavable groups (e.g. ester groups) are simultaneously present.

The manufacture of the starting compounds, i.e. the symmetric and unsymmetric disilylamines (II), and the end-products, i.e. the cyclodisilazanes, according to this second process is also expediently carried out in one operation, since the metal salts formed do not disturb the course of reaction and can easily be separated from the end products.

A third class of silazanes has been found which can serve for the preparation of the cyclodisilazanes of invention. According to the principle of process (a), illustrated above, they contain as a cleavable radical Y an organic silyl group, and as a cleavable radical Z an aminosilane group which is attached through its nitrogen. They can be formulated as follows:

(III) $R^6R^2R^1Si-N(R^3)-Si(R^1R^2)-N(R^3)-SiR^1R^2R^6$

In this formula $R^1$, $R^2$, $R^3$ and $R^6$ are defined as before.

The cyclization to the four-membered ring proceeds with bis(trimethylsilylanilino)-dimethylsilane, as an example, according to the equation:

(3) $2(CH_3)_3Si-N(C_6H_5)-Si(CH_3)_2-N(C_6H_5)-Si(CH_3)_3 \longrightarrow$

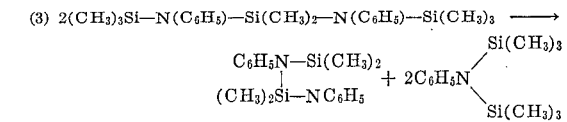

For the preparation of the starting compounds (III) which do not contain halogen attached to the silicon, the same diaminosilanes (I) used in the first basic process (1), are converted into the corresponding dialkali salts or di-Grignard derivatives in a known manner, and reacted with an organic silicon monohalide. The formation of the cyclodisilazanes with evolution of disilylamine according to the Equation 3 above, occurs extremely easily and may occasionally be observed even at ambient temperature.

When the reaction (3) proceeds via the corresponding halogen-containing bis(silylamino)-silanes, which as a rule, appear in the form of unstable intermediates only, the corresponding halogen-containing disilylamines (II) are formed as the fission products. Thus, the over-all reaction is:

$2Cl(CH_3)_2Si-N(C_6H_5)-Si(CH_3)_2-N(C_6H_5)-Si(CH_3)_2Cl \longrightarrow$

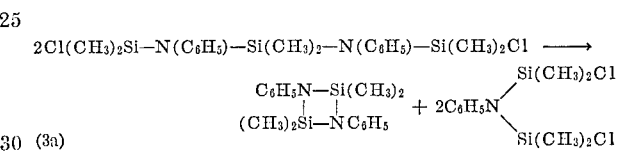

(3a)

It has already been mentioned on the occasion of specifying the second class of starting compounds (II), that such disilylamines which contain halogen attached to the silicon, are also converted on heating into cyclodisilazanes, i.e. they undergo the reaction (2), thereby a part of organic silicon dichloride is regenerated. Since it has been found that the metal salts arising as a by-product do not disturb the course of reaction and it would be desirable to consume the regenerated organic silicon dichloride, a simpler process has been worked out. This modified process comprises heating a diaminosilane (I) in the form of a dialkali salt or di-Grignard derivative, with an organic silicon dihalide, such as always employed in the practice of this invention, in a molar proportion of 1:1 at the optimal reaction temperature until the separation of the salts formed as by-products in the reaction is complete, i.e. the reaction has ceased. As in the preceding process (2), generally a solvent is used, since the metal derivatives of the diaminosilanes have to be prepared in a solvent. The necessary reaction temperature lies between about 70° to 150°, if one works in a heterogeneous system. When the metal derivatives are dissolved and the silicon halides are reactive enough, the reaction may proceed even at ambient temperature.

This reaction which is much more expensive than the thermal decomposition and cyclisation of a diaminosilane (reaction 1), is of advantage for the preparation of cyclodisilazanes having different organic radicals on the silicon atoms. For this purpose, the organic silicon dihalide used in the last step is different with respect to the organic groups from that which has been used for the preparation of the starting diaminosilane. It may be noted that considerable alterations of the melting points as well as of the boiling points of the desired cyclodisilazanes can be accomplished with such unsymmetric substitutions.

The reaction (3) is also useful when cyclodisilazanes are prepared which contain on the silicon unsaturated groups easy to split off, such as vinyl, allyl etc, or halogen atoms.

The halogen-containing cyclodisilazanes are obtained by reacting the di-metal salts of a diaminosilane with an organic silicon trihalide, or with silicon tetrahalide. On heating the di-lithium salt of bis(anilino)-dimethylsilane, with phenyltrichlorosilane, or tetrachlorosilane respectively, in a molar ratio of 1:1, the following cyclodisilazanes result:

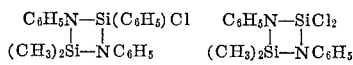

Another specific method feature of my invention comprises the reaction of a di-metal salt of a diaminosilane with an organotrichlorosilane or tetrachlorosilane in a molar ratio of 2:1. By this way, cyclodisilazane rings which are attached together can be obtained. These compounds can be illustrated as follows:

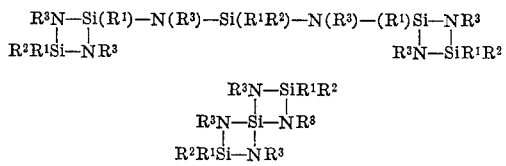

Still another specific method feature is the method which comprises the reaction with an organodichlorofluorosilane, or dichlorodifluorosilane. Using a molar ratio of 1:1 of the reactants, the same halogen-containing cyclodisilazanes result as has been formulated above, however, possessing fluorine instead of chlorine atoms.

The separation of the components of the reaction mixtures can be performed according to the directives given for the mixtures of the first basic process (1). The aliphatic cyclodisilazanes often are distillable.

The products resulting from the herein disclosed processes are liquid to solid, according to the organo groups which are present and to their distribution on the rings. They can be used as heat transferring liquids at high temperatures, lubricants or lubricant additives for thermally highly stressed machine parts, hydraulics, agents for textiles, anti-foamants, anti-oxidants, stabilizers, accelerators in vulcanization, plasticizers, hydrophobing agents, absorbers for neutrons, and for many other purposes.

The cyclodisilazanes which have at least one olefinic or acetylenic unsaturation, are valuable intermediates, since they can be subjected to well-known addition and polymerization reactions. The unsaturated substituents on the nitrogen and/or silicon atom may be vinyl, allyl, isopropenyl, 1-butenyl, crotyl, 3-butenyl, 2-methylallyl, cyclopentenyl, cyclopentadienyl, cyclohexenyl, cyclohexadienyl, styryl, vinylphenyl, cinnamyl, ethynyl, 1-propynyl, 2-propynyl, 1-butynyl, 2-butynyl, 3-butynyl, etc.; moreover, the silicon may be a part of an unsaturated ring like in silacyclopentene, silacyclopentadiene, silacyclohexadiene, etc.

As far as halogen atoms or other substituents which can be hydrolyzed are linked with the silicon atom, the compounds can be converted into the corresponding cyclodisilazanes which contain hydroxyl groups, or dimeric or polymeric condensation products thereof, such as

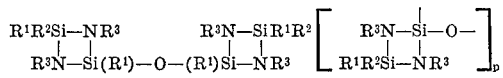

EXAMPLE 1

The product of the invention of this example is 1,3-diphenyl-diaza-2,4-tetramethyl-disiletidine. Bis(anilino)-dimethylsilane is kept in a flask provided with a thermometer which dips into the reaction mixture at the temperatures indicated in the following table. The aniline formed during the reaction is continuously distilled off through a distilling column. After the periods indicated, the reaction mixture is cooled, hexane added, the precipitated cyclodisilazane of the formula

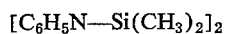

filtered off and dried for 3 hours at 70° in vacuum (0.1 mm.). The conversion is followed by determination of the quantity of the aniline evolved.

TABLE I

| Weighed portion, gms. | Temp. of the melt ° C. | Reaction time, mins. | Cyclodisilazane Gms. | Cyclodisilazane Percent | Aniline, percent |
|---|---|---|---|---|---|
| 12.0 | 340–350 | 60 | 1.70 | 23.0 | 22.3 |
| 12.0 | 340–345 | 180 | 3.90 | 52.8 | 51.9 |
| 12.0 | 340–350 | 360 | 6.25 | 84.7 | 84.3 |

Bath temperature 500°±3°. The cyclodisilazane recrystallized from benzene melts at 252.5°.

If the aniline is not removed from the reaction mixture, the yield of cyclodisilazane after a reaction time of 360 minutes is only 24%.

The reaction time can considerably be decreased (120 instead of 360 minutes) if 0.5–4% toluenesulfonic acid (as aniline salt) is added to the reaction mixture.

EXAMPLE 2

The product of the invention of this example is 1,3-diphenyl-diaza-2,4-tetraphenyl-disiletidine. Bis(anilino)-diphenylsilane is brought to reaction as described in the Example 1. Acetone is added, the precipitated cyclodisilazane of the formula [$C_6H_5N$-$Si(C_6H_5)_2$]$_2$ filtered off and dried as in the Example 1.

TABLE II

| Weighed portion, gms. | Temp. of the melt, ° C. | Reaction time, mins. | Cyclodisilazane Gms. | Cyclodisilazane Percent | Aniline, Percent |
|---|---|---|---|---|---|
| 10.9 | 419–435 | 15 | 1.31 | 16.1 | 16.3 |
| 10.9 | 420–437 | 30 | 4.59 | 56.5 | 56.1 |
| 10.9 | 419–435 | 45 | 5.67 | 70.9 | 70.1 |
| 10.9 | 418–436 | 60 | 7.20 | 88.9 | 88.1 |
| 10.9 | 419–440 | 90 | 7.90 | 97.3 | 97.5 |

Bath temperature 500°±3°. The cyclodisilazane recrystallized from nitrobenzene or bromobenzene melts at 355.5°.

EXAMPLE 3

The product of the invention of this example is 1,3-diethyl-diaza-2,4-tetraphenyl-disiletidine. 27.0 g. (0.1 mole) of bis(ethylamino)-diphenylsilane are heated as in Example 2 in an oil bath at 425° for 30 hours, thereby the temperature of the reaction mixture rises from 331° up to 425°. The conversion is 99.3% calculated on the amount of ethylamine recovered.

Crude yield 13.1 g. (58.1%). The crude yield was obtained after stirring the cooled reaction mixture with hexane and filtering the precipitated cyclodisilazane, as is described in Example 1. The cyclodisilazane melts after recrystallization in benzene at 195–196°. Yield 57%.

*Analysis.*—Calcd. for $C_{28}H_{30}N_2Si_2$ (percent): C, 74.61; H, 6.71; N, 6.22. Found (percent): C, 74.89; H, 6.34; N, 6.62.

Molecular weight: Calc. 450.7, found 435.

EXAMPLE 4

The product of the invention of this example is 1,3-di-m-trifluoromethylphenyl-diaza-2,4-tetramethyl-disiletidine. 18.9 g. (0.05 mole) of bis(meta-trifluoromethylanilino)-dimethylsilane are heated as in Example 2 in an oil bath at 320°, for 7.1 hours, thereby the temperature of the reaction mixture rises from 310° up to 320°. The conversion is 87% calculated on the amount of meta-trifluoromethylaniline recovered. Crude yield 7.4 g. (68%). The crude yield was obtained after stirring the cooled reaction mixture with hexane and filtering the precipitated cyclodisilazane, as is described in Example 1. The cyclodisilazane melts at 153–154° after recrystallization in light-petroleum with addition of charcoal. Yield 27%.

*Analysis.*—Calcd. for $C_{18}H_{20}F_6N_2Si_2$ (percent): C, 49.75; H, 4.64; N, 6.45. Found (percent): C, 50.54; H, 4.94; N, 6.58.

Molecular weight: Calc. 434.5, found 412.

EXAMPLE 5

The product of the invention of this example is 1,3-diethyl-diaza - 2,4 - bis-cyclotetramethylene-disiletidine. 17.2 g. (0.1 mole) of bis(ethylamino)-cyclotetramethylenesilane are refluxed in a nitrogen atmosphere until a mole of ethylamine per mole of starting compound is released. Duration about 2 days. The purification is accomplished by distillation. Yield 72%; B.P. 84°/0.4 mm., $n_D^{20}$ 1.4868.

*Analysis.*—Calcd. for $C_{12}H_{26}N_2Si_2$ (percent): C, 56.63; H, 10.30; N, 11.01. (Mol. wt. 254.5.) Found (percent): C, 56.96; H, 10.47; N, 10.98. (Mol. wt. 248.)

EXAMPLE 6

The product of the invention of this example is 1,3-diphenyl-diaza-2,4-tetramethyl-disiletidine. 11.6 gm. (0.1 mole) of bis(methylamino)-dimethylsilane are mixed with 9.3 gm. (0.1 mole) of aniline and refluxed. The reaction velocity and the conversion of the reactants is determined by recovering the methylamine which distills off in 1 N HCl.

TABLE III

| Time, mins. | Temp., °C. | 1 N HCl, mls. | Conversion, percent | Time, mins. | Temp., °C. | 1 N HCl, mls. | Conversion, percent |
|---|---|---|---|---|---|---|---|
| 3 | 100 | 20 | 10 | 50 | 245 | 120 | 60 |
| 4 | 110 | 40 | 20 | 100 | 285 | 140 | 70 |
| 6 | 170 | 60 | 30 | 185 | 300 | 160 | 80 |
| 15 | 195 | 80 | 40 | 345 | 305 | 180 | 90 |
| 28 | 219 | 100 | 50 | 456 | 314 | 190 | 95 |

200 ml. 1 N HCl=100% conversion.

The reaction mixture is worked up as described in the Example 1. Yield 14.1 gm. (94.3%); M.P. 252.5° (recrystallized from benzene).

EXAMPLE 7

The product of the invention of this example is 1,3-di-β-naphthyl-diaza-2,4-tetraphenyl-disiletidine. 40 gm. (0.15 mole) of bis(ethylamino)-diphenylsilane and 21.4 gm. (0.15 mole) of beta-naphthylamine are mixed and refluxed. The reaction speed and the conversion of the reactants is determined by recovering the ethylamine which distills off in 1 N HCl.

TABLE IV

| Time, mins. | Temp., °C. | 1 N HCl, mls. | Conversion, percent | Time, mins. | Temp., °C. | 1 N HCl, mls. | Conversion, percent |
|---|---|---|---|---|---|---|---|
| 20 | 195 | 20 | 6.6 | 82 | 360 | 160 | 53.0 |
| 30 | 297 | 40 | 13.3 | 87 | 360 | 180 | 60.0 |
| 38 | 322 | 60 | 20.0 | 92 | 360 | 200 | 66.5 |
| 47 | 331 | 80 | 26.5 | 103 | 360 | 220 | 73.5 |
| 57 | 341 | 100 | 33.5 | 109 | 360 | 240 | 80.0 |
| 67 | 349 | 120 | 40.0 | 131 | 360 | 260 | 86.5 |
| 75 | 355 | 140 | 46.5 | 163 | 360 | 280 | 93.5 |

200 ml. 1 N HCl=100% conversion.

The solidified reaction mixture is recrystallized from toluene. Yield 44.0 gm. (91.0%); M.P. 319°.

EXAMPLE 8

The product of the invention of this example is 1,3-di-β-napthyl-diaza-2,4 - tetramethyl-disiletidine. 14.6 gm. (0.1 mole of bis(ethylamino)-dimethylsilane and 14.3 gm. (0.1 mole) of beta-napthylamine are refluxed. The reaction speed and the conversion of the reactants is determined by recovering the methylamine which distills off in 1 N HCl.

TABLE V

| Time, mins. | Temp., °C. | 1 N HCl, mls. | Conversion, percent | Time, mins. | Temp., °C. | 1 N HCl, mls. | Conversion, percent |
|---|---|---|---|---|---|---|---|
| 8 | 100 | 20 | 10.0 | 66 | 316 | 120 | 60 |
| 9 | 123 | 40 | 20.0 | 98 | 345 | 140 | 70 |
| 10 | 131 | 60 | 30.0 | 120 | 360 | 160 | 80 |
| 13 | 161 | 80 | 40.0 | 160 | ~400 | 180 | 90 |
| 25 | 265 | 100 | 50.0 | 230 | ~400 | 190 | 95 |

200 ml. 1 N HCl=100% conversion.

The solidified reaction mixture is recrystallized from cyclohexane. Yield 18.6 gm. (93.5%); M.P. 237°, B.P. 436–440°/720 mm.

EXAMPLE 9

The product of the invention of this example is 1,3-di-α-napthyl-diaza-2,4 - tetramethyl-disiletidine. 14.6 gm. (0.1 mole) of bis(ethylamino)-dimethylsilane and 14.6 gm. (0.1 mole) of alpha-naphthylamine are refluxed. The reaction velocity and the conversion of the reactants is determined by recoving the methylamine which distills off in 1 N HCl.

TABLE VI

| Time, mins. | Temp., °C. | 1 N HCl, mls. | Conversion, percent | Time, mins. | Temp., °C. | 1 N HCl, mls. | Conversion, percent |
|---|---|---|---|---|---|---|---|
| 27 | 164 | 20 | 10.0 | 570 | 290 | 120 | 60.0 |
| 95 | 175 | 40 | 20.0 | 680 | 320 | 140 | 70.0 |
| 215 | 196 | 60 | 30.0 | 730 | 360 | 160 | 80.0 |
| 334 | 214 | 80 | 40.0 | 770 | 400 | 180 | 90.0 |
| 455 | 246 | 100 | 50.0 | | | | |

200 ml. 1 N HCl=100% conversion.

The solidified reaction mixture is recrystallized from cyclohexane. Yield 16.8 gm. (82.2%); M.P. 252–253°.

EXAMPLE 10

The product of the invention of this example is 1,3-di-m - trifluoromethylphenyl-diaza-2,4 - tetraphenyl-disiletidine. 27.0 g. (0.1 mole) of bis(ethylamino)-diphenylsilane and 16.1 g. (0.1 mole) of meta-trifluoromethylaniline are heated as in Example 9. The temperature of the reaction mixture rises from 242° up to 380° in 12 hours. The conversion is 94.5%, calculated on the amount of ethylamine recovered.

Crude yield 22.4 g. (65.5%). The crude yield was obtained after stirring the cooled reaction mixture with hexane and filtering the precipitated cyclodisilazane, as is described in Example 1. The cyclodisilazane melts at 183–185°, after recrystallization in cyclohexane with addition of charcoal. Yield 63.1%.

Analysis.—Calcd. for $C_{38}H_{28}F_6N_2Si_2$ (percent): C, 66.84; H, 4.13; N. 4.10. Found (percent): C, 66.55; H, 4.21; N, 4.56.

Molecular weight: Calc. 682.8, found 674.

EXAMPLE 11

The product of the invention of this example is 1,3-di-m-fluorophenyl-diaza-2,4-tetraphenyl-disiletidine. 27.0 g. (0.1 mole) of bis(ethylamino)-diphenylsilane and 11.1 g. (0.1 mole) of meta-fluoroaniline are heated as in Example 9. The temperature of the reaction mixture rises from 220° up to 398° in 19.1 hours. The conversion is 95%, calculated on the amount of ethylamine recovered. Crude yield 24.4 g. (83.7%). The crude yield was obtained after stirring the cooled reaction mixture with hexane and filtering the precipitated cyclodisilazane, as is described in Example 1. The cyclodisiliazane melts at 311–312°, after recrystallization in xylene (mixture of isomers) with addition of charcoal. Yield 75.8%.

Analysis.—Calcd. for $C_{36}H_{28}F_2N_2Si_2$ (percent): C, 74.19; H, 4.84; N, 4.81. Found (percent): C, 73.95; H, 4.82; N, 4.97.

Molecular weight: Calc. 582.8, found 578.

EXAMPLE 12

The product of the invention of this example is 1,3-di-p-fluorophenyl-diaza-2,4 - teraphenyl-disiletidine. 27.0 g. (0.1 mole) of bis(ethylamino)-diphenylsilane and 11.1 g. (0.1 mole) of para-fluoroaniline are heated as in Example 9. The temperature of the reaction mixture rises from 220° up to 380° in 19.8 hours. The conversion is 94.5%, calculated on the amount of ethylamine recovered.

Crude yield 21.1 g. (72.6%). The crude yield was obtained after stirring the cooled reaction mixture with hexane and filtering the precipitated cyclodisilazane, as is described in Example 1. The cyclodisilazane melts at 322–323°, after recrystallization in xylene with addition of charcoal. Yield 70%.

Analysis.—Calcd. for $C_{36}H_{28}F_2N_2Si$ (percent): C, 74.19; H, 4.84; N, 4.81. Found (percent): C, 74.12; H, 4.79; N 4.89.

Molecular weight: Calc. 582.8, found 575.

EXAMPLE 13

The product of the invention of this example is 1,3-di-m-chlorophenyl-diaza-2,4-tetraphenyl-disiletidine. 27.0 g. (0.1 mole) of bis(ethylamino)-diphenylsilane and 12.7 g. (0.1 mole) of meta-chloroaniline are heated as in Example 9. The temperature of the reaction mixture rises from 252° up to 378° in 10.5 hours. The conversion is 93.5%, calculated on the amount of ethylamine recovered.

Crude yield 19.2 g. (62.5%). The crude yield was obtained after stirring the cooled reaction mixture with hexane and filtering the precipitated cyclodisilazane, as is described in Example 1. The cyclodisilazane melts at 361–362°, after recrystallization in cyclohexane with addition of charcoal. Yield 60.2%.

Analysis.—Calcd. for $C_{36}H_{28}Cl_2N_2Si_2$ (percent): C, 70.23; H, 4.58; N, 4.55. Found (percent): C, 70.36; H, 4.40; N, 4.51.

Molecular weight: Calc. 615.7, found 585.

EXAMPLE 14

The product of the invention of this example is 1,3-di(2,4-difluorophenyl)-diaza-2,4 - tetraphenyl-disiletidine. 13.5 g. (0.05 mole) of bis(ethylamino)-diphenylsilane and 6.45 g. (0.05 mole) of 2,4-difluoroaniline are heated as in Example 9. The temperature of the reaction mixture rises from 203° up to 380° in 14.5 hours. The conversion is 85.6%, calculated on the amount of ethylamine recovered. Crude yield 9.2 g. (59.5%). The crude yield was obtained after stirring the cooled reaction mixture with hexane and filtering the precipitated cyclodisilazane, as is described in Example 1. The cyclodisilazane melts at 338° after recrystallization in xylene. Yield 52.3%.

Analysis.—Calcd. for $C_{36}H_{26}F_4N_2Si_2$ (percent): C, 69.88; H, 4.24; N, 4.53. Found (percent): C, 70.23; H, 4.17; N, 4.64.

Molecular weight: Calc. 618.8, found 615.

EXAMPLE 15

The product of the invention of this example is 1,3-di[3,5 - di(trifluoromethyl)phenyl]-diaza-2,4-tetraphenyl-disiletidine. 13.5 g. (0.05 mole) of bis(ethylamino)-diphenylsilane and 11.5 g. (0.05 mole) of 3,5-di(trifluoromethyl)-aniline are heated as in Example 9. The temperature of the reaction mixture rises from 218° up to 365° in 14.2 hours. The conversion is 93.9%, calculated on the amount of ethylamine recovered.

Crude yield 14.3 g. (70%). The crude yield was obtained after stirring the cooled reaction mixture with hexane and filtering the precipitated cyclodisilazane, as is described in Example 1. The cyclodisilazane melts at 262–264°, after recrystallization in xylene with addition of charcoal. Yield 69.1%.

Analysis.—Calcd. for $C_{40}H_{26}F_{12}N_2Si_2$ (percent): C, 58.67; H, 3.20; N, 3.42. (Mol. wt. 818.8.) Found (percent): C, 58.75; H, 3.84; N, 3.78. (Mol. wt. 800.)

EXAMPLE 16

The product of the invention of this example is 1,3-di(2,5-difluorophenyl)-diaza - 2,4 - tetraphenyldisiletidine. 13.5 g. (0.05 mole) of bis(ethylamino)-diphenylsilane and 6.45 g. (0.05 mole) of 2,5-difluoroaniline are heated as in Example 9. The temperature of the reaction mixture rises from 204° up to 405° in 32.2 hours. The conversion is 92.1%, calculated on the amount of ethylamine recovered. Crude yield 9.0 g. (58%). The crude yield was obtained after stirring the cooled reaction mixture with hexane and filtering the precipitated cyclodisilazane, as is described in Example 1. The cyclodisilazane melts at 324–326°, after recrystallization in xylene with addition of charcoal. Yield 57.4%.

Analysis.—Calcd. for $C_{36}H_{26}F_4N_2Si_2$ (percent): C, 69.88; H, 4.24; N, 4.53. Found (percent): C, 70.79; H, 4.57; N, 5.01.

EXAMPLE 17

The product of the invention of this example is 1,3-diphenyl-diaza - 2,4 - dicyclotetramethylene - disiletidine. 12.9 g. (0.075 mole) of bis(ethylamino)-cyclotetramethylenesilane and 6.98 g. (0.075 mole) of aniline are heated as in Example 9. The temperature of the reaction mixture rises from 110° up to 350° in 7.4 hours. The conversion is 89.5%, calculated on the amount of ethylamine recovered.

Crude yield 10.8 g. (82.5%). The crude yield was obtained after stirring the cooled reaction mixture with hexane and filtering the precipitated cyclodisilazane, as is described in Example 1. The cyclodisilazane melts at 225–227°, after recrystallization in hexane. Yield 79.3%.

Analysis.—$C_{20}H_{26}N_2Si_2$. (Molecular weight: Calc. 350.6, found 330. Calc. (percent): C, 68.51; H, 7.47; N, 7.99. (Mol. wt. 350.6). Found (percent.): C, 67.9; H, 8.94; N, 7.57. (Mol. wt. 330.)

EXAMPLE 18

The product of the invention of this example is 1,3-di-m-bromophenyl-diaza-2,4-tetraphenyl-disiletidine. 27.0 g. (0.1 mole) of bis(ethylamino)-diphenylsilane and 18.5 g. (0.1 mole) of meta-bromoaniline are heated as in Example 9. The temperature of the reaction mixture rises from 240° up to 268° in 12.2 hours. The conversion is 96%, calculated on the amount of ethylamine recovered.

Crude yield 20.5 g. (54%). The crude yield was obtained after stirring the cooled reaction mixture with hexane and filtering the precipitated cyclodisilazane, as is described in Example 1. The cyclodisilazane melts at 270–272°, after recrystallization in cyclohexane. Yield 51.2%.

*Analysis.*—$C_{36}H_{28}N_2Br_2Si_2$. Molecular weight: calc. 704.6, found 675. Calc. (percent): C, 61.36; H, 4.01; N, 3.98. (Mol. wt. 704.6.) Found (percent): C, 61.32; H, 4.29; N, 4.32. (Mol. wt. 675.)

EXAMPLE 19

The product of the invention of this example is 1,3-di-m-phenoxyphenyl-diaza-2,4-tetraphenyl-disiletidine. 11 g. (0.075 mole) of bis(ethylamino)-dimethylsilane and 13.8 g. (0.075 mole) of meta-phenoxyaniline are heated as in Example 9. The temperature of the reaction mixture rises from 100° up to 470° in 6 hours. The conversion is 96%, calculated on the amount of ethylamine recovered. Crude yield 18.2 g. (100%). The crude yield was obtained after stirring the cooled reaction mixture with hexane and filtering the precipitated cyclodisilazane, as is described in Example 1. The cyclodisilazane melts at 169–172°, after recrystallization in hexane with addition of charcoal. Yield 15.5 g. (85%). Boiling point about 470°.

*Analysis.*—Calcd. for $C_{28}H_{30}N_2O_2Si_2$ (percent): C, 69.66; H, 6.62; N, 5.80. Found (percent): C, 70.31; H, 6.47; N, 6.02.

EXAMPLE 20

The product of the invention of this example is 1,3-bis(2,4,6-trimethylphenyl)-diaza-2,4-tetramethyl-disiletidine. 14.6 g. (0.1 mole) of bis(ethylamino)-dimethylsilane and 13.5 g. (0.1 mole) of 2,4,6-trimethylaniline are refluxed in a nitrogen atmosphere. The temperature of the reaction mixture increases from 166° to 315° in 37 hours. Conversion 93.5%.

Yield (after twice recrystallizations in cyclohexane) 13.6 g. (71%); M.P. 248–250°.

*Analysis.*—Calcd. for $C_{22}H_{34}N_2Si_2$ (percent): C, 69.04; H, 8.96; N, 7.32. (Mol. wt. 382.7.) Found (percent): C, 68.85; H, 8.20; N, 7.51. (Mol. wt. 371.)

EXAMPLE 21

The product of the invention of this example is 1,3-bis(p-dimethylaminophenyl) - diaza - 2,4 - tetramethyl-disiletidine. 14.6 g. (0.1 mole) bis(ethylamino)-dimethylsilane and 13.6 g. (0.1 mole) of para-amino-dimethylaniline are heated. The temperature of the reaction mixture rises from 149° up to 325° in 18 hours. Conversion 88% (not finished). Yield (after twice recrystallizations (1) in cyclohexane/hexane/benzene, (2) in pure cyclohexane) 8.0 g. (42%); M.P. 233–236°.

*Analysis.*—Calcd. for $C_{20}H_{32}N_2Si_2$ (percent): C, 62.45; H, 8.38; N, 14.57. (Mol. wt. 384.7.) Found (percent): C, 62.36; H, 7.97; N, 14.92. (Mol. wt. 365.)

EXAMPLE 22

The product of the invention of this example is 1,3-bis(o-diphenyl)-diaza-2,4-tetramethyl-disiletidine. 14.6 g. (0.1 mole) of bis(ethylamino)-dimethylsilane and 17.02 g. (0.1 mole) of 2-aminodiphenyl are heated. The temperature of the reaction mixture rises from 162° up to 390° in 38 hours. Conversion 91%.

Yield (after recrystallization in light petroleum) 30–50%; M.P. 187–188°.

*Analysis.*—Calcd. for $C_{28}H_{30}N_2Si_2$ (percent): C, 74.61; H, 6.71; N, 6.22. (Mol. wt. 450.7.) Found (percent): C, 74.59; H, 6.42; N, 6.30. (Mol. wt. 438.)

EXAMPLE 23

The product of the invention of this example is 1,3-bis (p-diphenyl)-diaza-2,4-tetramethyl-disiletidine. 14.6 g. (0.1 mole) of bis(ethylamino)-dimethylsilane and 17.02 g. (0.1 mole) of 4-aminodiphenyl are heated. The temperature of the reaction mixture rises from 115° up to 300° in 18 hours. Conversion 92%.

Yield (after recrystallization in xylene) 53%; M.P. 273–276°.

*Analysis.*—Calcd. for $C_{28}H_{30}N_2Si_2$ (percent): C, 74.61; H, 6.71; N, 6.22. (Mol. wt. 450.7.) Found (percent): C, 74.52; H, 6.80; N, 6.25. (Mol. wt. 485.)

EXAMPLE 24

The product of the invention of this example is 1,3-bis (m - methoxyphenyl) - diaza-2,4-tetramethyl-disiletidine. 14.6 g. (0.1 mole) of bis(ethylamino)-dimethylsilane and 12.3 g. (0.1 mole) of meta-methoxyaniline are heated. The temperature of the reaction mixture rises from 122° up to 360° in 24 hours. Conversion 96%.

Yield (after twice recrystallization with addition of charcoal) 12.8 g. (73%); M.P. 169–171°.

*Analysis.*—Calcd. for $C_{18}H_{26}N_2O_2Si_2$ (percent): C, 60.29; H, 7.31; N, 7.81. (Mol. wt. 358.6.) Found (percent): C, 60.84; H, 7.21; N, 8.00. (Mol. wt. 348.)

EXAMPLE 25

The product of the invention of this example is 1,3-bis (p-diphenyl)diaza-2,4-tetraphenyl-disiletidine. 27.0 g. (0.1 mole) of bis(ethylamino)-diphenylsilane and 18.4 g. (0.1 mole) of 4-aminodiphenyl are heated. The temperature of the mixture rises from 315° up to 432° in 86 minutes. Conversion 95%.

Crude yield 91%. After recrystallization twice in benzene the cyclodisilazane melts at 241–242°.

*Analysis.*—Calcd. for $C_{48}H_{40}N_4Si_2$ (percent): C, 79.08; H, 5.53; N, 7.68. Found (percent): C, 79.01; H, 5.45; N, 7.68.

EXAMPLE 26

The product of the invention of this example is 1,3-bis (p-phenoxyphenoxyphenyl)-diaza-2,4-tetramethyl disiletidine. 8.76 g. (0.06 mole) of bis(ethylamino)-dimethylsilane and 16.6 g. (0.06 mole) of p-$C_6H_5OC_6H_4OC_6NH$ (B.P. 214–216°/0.1 mm.) are heated. The temperature of the mixture rises from 162° up to 430° in 4.5 hours. Conversion 90%. The resinous content of the flask is recrystallized in cyclohexane/benzene 7:1 with addition of charcoal.

Yield 14.8 g. (74.2%); M.P. 212–213°.

*Analysis.*—Calcd. for $C_{40}H_{38}O_4N_2Si_2$ (percent): C, 72.04; H, 5.74; N, 4.20. (Mol. wt. 666.8.) Found (percent): C, 73.05; H, 5.84; N, 4.52. (Mol. wt. 660)

EXAMPLE 27

The product of the invention of this example is 1,3-bis-phenyl - diaza - 2,4-(tetra-p-phenoxyphenyl)-disiletidine. 13.6 g. (0.03 mole) of p-$(C_6H_5OC_6H_4)_2Si(NHC_2H_5)_2$ (B.P. 252–253°/0.01 mm.; M.P. 55–58°) and 2.79 g. (0.03 mole) of aniline are heated. The temperature of the mixture rises from 192° up to 406° in 6 hours. Conversion 86.5%. Yield (after recrystallization in chlorobenzene) 9.1 g. (66.4%); M.P. 322°.

*Analysis.*—Calcd. for $C_{40}H_{38}O_4N_2Si_2$ (percent): C, 78.74; H, 5.06; N, 3.06. Found (percent): C, 77.69; H, 4.83; N, 2.88.

EXAMPLE 28

The product of the invention of this example is 1,3-bis (m - phenoxyphenyl)-diaza-2,4-(tetra-p-phenoxyphenyl)-disiletidine. 13.6 g. (0.03 mole) of the same compound as in Example 27 and 5.55 g. (0.03 mole) of meta-phenoxyaniline are heated. The temperature of the mixture rises from 160° up to 410° in 5 hours. Conversion 87.5%. The resin has a softening point of about 40–50° and cannot be crystallized. The purification is accomplished by distillation.

Yield 78%; B.P. 425–435°/0.02 mm.

*Analysis.*—Calcd. for $C_{72}H_{54}O_6N_2Si_2$ (percent): C, 78.66; H, 4.95; N, 2.55. Found (percent): C, 77.75; H, 5.02; N, 2.93.

EXAMPLE 29

The product of the invention of this example is 1,3-bis (2,5 - diphenoxyphenyl)-diaza-2,4-tetramethyl-disiletidine. 10.9 g. (0.075 mole) of bis(ethylamino)-dimethylsilane and 20.8 g. (0.075 mole) of 2,5-di-phenoxy-aniline are heated. The temperature of the mixture rises from 140° up to 430° in 4 hours. Conversion 93%.

The resin cannot be crystallized. It is soluble in benzene hexane, halogenohydrocarbons and acetone. The purification is accomplished by distillation.

Yield 20.5 g. (82%); softening point about 40°; B.P. 315–319°/0.05 mm.

Analysis.—Calcd. for $C_{40}H_{38}O_4N_2Si_2$ (percent): C, 72.04; H, 5.74; N, 4.20. (Mol. wt. 666.9.) Found (percent): C, 71.10; H, 5.96; N, 4.42. (Mol. wt. 634.)

EXAMPLE 30

The product of the invention of this example is 1,3-bis (m - phenoxyphenyl) - diaza-2,4-tetramethyl-disiletidine. 11.0 g. (0.075 mole) of bis(ethylamino)-dimethylsilane and 13.8 g. (0.075 mole) of meta-phenoxyaniline are heated. The temperature of the mixture rises from 100° up to 470° in 6 hours. Conversion 96%.

Crude yield 16.4 g. (90%). After recrystallizing in hexane with addition of charcoal the cyclodisilazane melts at 169–172°; B.P. about 470°. Yield 15.5 g. (85%).

Analysis.—Calcd. for $C_{28}H_{30}N_2O_2Si_2$ (percent): C, 69.66; H, 6.26; N, 5.80. Found (percent): C, 69.78; H, 6.16; N, 5.84.

EXAMPLE 31

The product of the invention of this example is 1,3-diphenyl-diaza-2,4-tetramethyl-disiletidine. To 14.0 gm. (0.15 mole) of pure aniline in 100 ml. of xylene are added in a nitrogen atmosphere with stirring 50 ml. (0.3 mole) of a 6 N-solution of butyl lithium in hexane. The di-lithium salt of the aniline separates as a white precipitate. In order to complete the reaction, the mixture is kept at 100° for 1 hour. After addition of 50 ml. of xylene, the hexane is distilled off.

To the suspension of the di-lithium salt is added in a nitrogen atmosphere a solution of 19.4 gm. (0.15 mole) of pure $(CH_3)_2SiCl_2$ in 20 ml. of xylene. The mixture is subsequently refluxed (about 140°). The separated precipitate, consisting of the 4-membered ring compound and the lithium chloride formed as a by-product, is worked up by extracting for several hours with xylene.

The residue 12.8 gm. of lithium chloride (0.3 mole), corresponding to a conversion of 100%. The xylene extract consist of 9.82 gm. of Si-dimethyl-N-phenyl-cyclodisilazane (=44% of the theory). Recrystallized in benzene, the melting point is 252.5°.

Analysis.—Calcd. for $C_{16}H_{22}N_2Si_2$ (percent): C, 64.37; H, 7.43; N, 9.38; Si, 18.81. Found (percent): C, 64.39; H, 7.08; N, 9.78; Si, 18.19.

Molecular weight: Calcd. 298.5, found 298.

If one proceeds as indicated above, using however (a) 25.7 gm. (0.2 mole) of the dilithium salt and (b) 38.7 gm. (0.3 mole) of $(CH_3)_2SiCl_2$. The conversion is in both cases 100%. The yields after recrystallization in benzene are (a) 11.9 gm. (53.1% of the theory) and (b) 13.3 gm. (59.5% of the theory).

EXAMPLE 32

The product of the invention of this example is 1,3-diphenyl-diaza-2,4-tetraphenyl-disiletidine. From 14.0 gm. (0.15 mole) of aniline and 50 ml. of butyl lithium (a 6 N-solution in hexane), the di-lithium salt is prepared as described in Example 31.

To the suspension of the di-lithium salt is added in a nitrogen atmosphere with stirring a solution of 95.0 gm. (0.37 mole) of pure $(C_6H_5)_2SiCl_2$ in 50 ml. of xylene. After having the mixture refluxed (about 140°) for 5 hours, it is kept in an autoclave at 250°–300° for 15 hours. The separated precipitate consisting of the four-membered ring compound and lithium chloride formed as a by-product is worked up by extracting with xylene or bromobenzene. It remains 12.1 gm. of lithium chloride corresponding to a conversion of 95%. The extract consists of 19.8 gm. of Si-diphenyl-N-phenylcyclodisilazane (=48.5% of the theory). Recrystallized in nitrobenzene or bromobenzene, the melting point is 355.5°.

Analysis.—Calcd. for $C_{36}H_{30}N_2Si_2$ (percent): C, 79.07; H, 5.53; N, 5.12. Found (percent): C, 79.07; H, 5.56; N, 5.34.

Molecular weight: Calcd. 546.8, found 576.

The yield of four-membered ring compound is only about 23% if an equimolar amount of diphenyldichlorosilane is used.

EXAMPLE 33

The product of the invention of this example is 1,3-diphenyl-diaza-2,4-tetramethyl-disiletidene. To 29.8 gm. (0.18 mole) of trimethylsilylaniline in 30 ml. of xylene are added in a nitrogen atmosphere with stirring 30 ml. (0.18 mole) of a 6 N-solution of butyl lithium in hexane and the mixture is heated at 50–60° for 1 hour. The suspension of the lithium salt obtained is added dropwise to 23.2 gm. (0.18 mole) of dimethylsilicon dichloride in 100 ml. of xylene and subsequently refluxed for 5 hours. The conversion is 100% calculated on the amount of lithium chloride (7.63 gm.) isolated. The centrifuged solution is freed from xylene and the residue (45.3 gm.) fractionally distilled.

Yield 39.8 gm. (86.0%) of unsymmetric disilylamine of the formula $(CH_3)_3Si—N(C_6H_5)—Si(CH_3)_2Cl$; B.P. 71–72°/0.2 mm.; $n_D^{20}$ 1.4977.

Analysis.—Calcd. for $C_{11}H_{20}NSi_2Cl$ (percent): C, 51.22; H, 7.82; Cl, 13.76. Found (percent): C, 50.95; H, 7.61; Cl, 13.75.

Molecular weight: calcd. 257.9, found 257.0.

11.46 gm. (0.042 mole) of the compound obtained above are refluxed in a flask fitted with a reflux condenser. Soon the reaction starts and trimethylsilicon chloride distills through the condenser which is kept at 60°. The temperature of the mixture raises to 250–270° within 3 hours, thereby the content of the flask solidifies. Hexane is added to the cooled reaction mixture and the crystals filtered off with suction.

Crude yield 6.8 gm. (80.5%) of cyclodisilazane of the formula $[(CH_3)_2Si—NC_6H_5]_2$; M.P. 252.5° (recrystallized in xylene).

EXAMPLE 34

The product of the invention of this example is 1,3-diphenyl-diaza - 2,4 - tetramethyl-disiletidine. To 38.2 gm. (0.18 mole) of $C_6H_5NHSi(CH_3)_2NHC_6H_5$ in 100 ml. of xylene are added dropwise under nitrogen with stirring 60 ml. (0.36 mole) butyl lithium (a 6 N-solution in xylene). The lithium salt separates as a white precipitate. To this suspension are added with stirring 23.2 gm. (0.18 mole) dimethyldichlorosilane, kept at room temperature for 4 hours and subsequently heated at refluxing temperature for 4 hours. The precipitate which is formed, is filtered off with suction, washed with n-hexane and extracted with xylene using a Soxhlet apparatus (duration about 16 hours). The four-membered ring compound crystallizes on cooling. The crystals are recrystallized in 120 ml. $CHCl_3$/n-hexane 3:1; M.P. 252.5° C., soluble in chloroform, acetone and benzene. The crude product can also be sublimed at 210–220° C./720 mm. without decomposition. The conversion is 100% calculated on the amount of lithium chloride isolated.

Analysis.—Calcd. for $C_{16}H_{22}N_2Si_2$ (percent): C, 64.37; H, 7.43; N, 9.38; Si, 18.81. Found (percent): C, 64.39; H, 7.08; N, 9.78; Si, 18.19.

Molecular weight: Calcd. 298.6, found 298.3.

The X-ray diffraction determination of the crystal and molecular structure proved the compound to be a 4-membered cyclic ring, i.e. a cyclodisilazane.

EXAMPLE 35

The product of the invention of this example is 1,3-diphenyl-diaza-2,4-tetraphenyl-disiletidine. The di-lithium salt of 73.30 gm. (0.2 mole) of

$C_6H_5NH—Si(C_6H_5)_2—NHC_6H_5$ is prepared as in Example 34 employing totally 250 ml. of xylene. To the suspension are added with stirring 50.6 gm. (0.2 mole) of $(C_6H_5)_2SiCl_2$ and the mixture is refluxed (140°) for 16 hours. The conversion is 100% calculated on the amount of lithium chloride isolated. The precipitate which is formed is filtered off with suction, washed with n-hexane and extracted with xylene using a Soxhlet apparatus. The crude cyclodisilazane is recrystallized in bromobenzene. Yield 68.3 gm. (62.8%); M.P. 355.5°; B.P. ca. 500°/720 mm.

The compound is identical with those from the Examples 2 and 8.

EXAMPLE 36

The product of the invention of this example is 1,3-diphenyl-diaza-2-dimethyl-4-diphenyl-disiletidine. The di-lithium salt of 59.5 gm. (0.16 mole) of

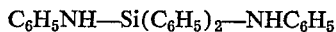
$C_6H_5NH—Si(C_6H_5)_2—NHC_6H_5$ is prepared as in Example 34 employing totally 200 ml. of xylene. To the suspension are added with stirring 20.9 gm. (0.16 mole) of $(CH_3)_2SiCl_2$ and the mixture is refluxed (140°) for 8 hours. The precipitate which is formed is filtered off with suction and washed with n-hexane. The conversion is 100% calculated on the amount of lithium chloride isolated. The crude cyclodisilazane is recrystallized in hexane. Yield 37.0 gm. (54%); M.P. 180–181.5°.

*Analysis.*—Calcd. for $C_{26}H_{26}N_2Si_2$ (percent): C, 73.88; H, 6.20; N, 6.63. Found (percent): C, 73.78; H, 6.18; N, 6.65.

Molecular weight: Calcd. 422.7, found 418.

EXAMPLE 37

The product of the invention of this example is 1,3-diphenyl-diaza-2-dimethyl-4-dichloro-disiletidine. The di-lithium salt of 43.0 gm. (0.18 mole) of

$C_6H_5NH-Si(CH_3)_2-NHC_6H_5$ is prepared as in Example 34 employing 250 ml. of benzene. The suspension is added with stirring to 30.2 gm. (0.18 mole) of $SiCl_4$ and the mixture is refluxed (80°) for 1 hour. The conversion is 100% calculated on the amount of lithium chloride isolated. The precipitate which is formed is filtered off with suction and washed with n-hexane. The crude cyclodisilazane is recrystallized in cyclohexane. Yield 38.9 gm. (64.5%); M.P. 210–220°.

*Analysis.*—Calcd. for $C_{14}H_{16}N_2Cl_2Si_2$ (percent): C, 49.54; H, 4.75; N, 8.25; Si, 16.55. Found (percent): C, 49.74; H, 4.74; N, 8.40; Si, 16.65.

Molecular weight: calcd. 339.4, found 326.

EXAMPLE 38

The product of the invention of this example is 1,3-diphenyl-diaza-2-dimethyl-4-methyl-4-chloro-disiletidine. The di-lithium salt of 43.0 gm. (0.18 mole) of

$C_6H_5NH-Si(CH_3)_2-NHC_6H_5$ is prepared as in Example 34 employing 250 ml. of toluene. The suspension is added with stirring to 26.5 gm. (0.18 mole) of $CH_3SiCl_3$ and the mixture is refluxed (110°) for 3–4 hours. The conversion is 100% calculated on the amount of lithium chloride isolated. The precipitate which is formed is filtered off with suction and washed with n-hexane. The crude cyclodisilazane is recrystallized in benzene. Yield 48.4 (85.5%) M.P. 243–245°.

*Analysis.*—Calcd. for $C_{15}H_{19}N_2Cl_1Si_2$ (percent): C, 56.48; H, 6.00; N, 8.78; Si, 17.61. Found (percent): C, 56.48; H, 5.52; N, 8.92; Si, 17.48.

Molecular weight: calcd. 318.9, found 307.

EXAMPLE 39

The product of the invention of this example is 1,3-dicyclohexyl-diaza-2,4-tetramethyl-disiletidine. The di-lithium salt of 38.2 gm. (0.15 mole) of

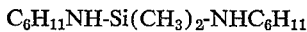
$C_6H_{11}NH-Si(CH_3)_2-NHC_6H_{11}$ (B.P. 148°/11 mm.; $n_D^{20}$ 1.4773) is prepared as in Example 34 employing totally 100 ml. of toluene. To the solution are added with stirring 19.4 gm. (0.15 mole) of $(CH_3)_2SiCl_2$ and the mixture is refluxed (110°) for 2–3 hours. The conversion is 100% calculated on the amount of lithium chloride isolated. The crude cyclodisilazane is distilled in vacuum. Yield 34.2 gm. (73.8%); M.P. 104–105°; B.P. 120°/0.1 mm.

*Analysis.*—Calcd. for $C_{16}H_{34}N_2Si_2$ (percent): C, 61.86; H, 11.03; N, 9.02. Found (percent): C, 61.80; H, 10.57; N, 9.15.

Molecular weight: calcd. 310.6, found 312.

The cyclodisilazane is found by gas chromatography to be pure.

EXAMPLE 40

The product of the invention of this example is 1,3-diethyl-diaza-2,4-tetramethyl-disiletidine. The di-lithium salt of 21.9 gm. (0.15 mole) of

$C_2H_5NH-Si(CH_3)_2-NHC_2H_5$ (B.P. 137–139°/720 mm.; $n_D^{20}$ 1.4159) is prepared as in Example 34 employing totally 130 ml. of toluene. To the solution are added with stirring 22.0 gm. (0.17 mole) of $(CH_3)_2SiCl_2$, dissolved in 10 ml. of toluene, and the mixture is refluxed (110°) for 2 hours. The conversion is 98.5% calculated on the amount of lithium chloride (12.5 gm.) isolated. The crude cyclodisilazane is distilled in vacuum. Yield 12.3 gm. (41%); B.P. 93.5°/82 mm.; $n_D^{20}$ 1.4250.

*Analysis.*—Calcd. for $C_8H_{22}N_2Si_2$ (percent): C, 47.46; H, 10.95; N, 13.84. Found (percent): C, 47.73; H, 10.91; N, 14.04.

Molecular weight: Calcd. 202.4, found 203.

The cyclodisilazane is found by gas chromatography to be pure.

EXAMPLE 41

The product of the invention of this example is 1,3-di-n-butyl-diaza-2,4-tetramethyl-disiletidine. The dilithium salt of 30.3 gm. (0.15 mole) of

$n-C_4H_9NH-Si(CH_3)_2-NHC_4H_9-n$ (B.P. 86.0/11 mm.; $n_D^{20}$ 1.4299) is prepared as in Example 34 employing totally 150 ml. of toluene. To the solution are added with stirring 19.4 gm. (0.15 mole) of $(CH_3)_2SiCl_2$, dissolved in 10 ml. of toluene, and the mixture is refluxed (110°) for 2 hours. The conversion is 97% calculated on the amount of lithium chloride (12.3 gm.) isolated. The crude cyclodisilazane is distilled in vacuum. Yield 32.3 gm. (83%); B.P. 89.0/6 mm.; $n_D^{20}$ 1.4367.

*Analysis.*—Calcd. for $C_{12}H_{30}N_2Si_2$ (percent): C, 55.74; H, 11.69; N, 10.83. Found (percent): C, 55.40; H, 11.07; N, 10.89.

Molecular weight: Calcd. 258.5, found 255.

The cyclodisilazane is found by gas chromaoography to be pure.

EXAMPLE 42

The product of the invention of this example is 1,3-di-tert-butyl-diaza-2,4-tetramethyl-disiletidine. The dilithium salt of 30.3 gm. (0.15 mole) of

$t-C_4H_9NHSi(CH_3)_2-NHC_4H_9-t$ (B.P. 63/12 mm.; $n_D^{20}$ 1.4282) is prepared as in Example 34 employing totally 150 ml. of toluene. To the solution are added with stirring 19.4 gm. (0.15 mole) of

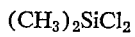
$(CH_3)_2SiCl_2$ dissolved in 10 ml. of toluene, and the mixture is refluxed (110°) for 2 hours. The conversion is 100% calculated on the amount of lithium chloride isolated. The crude cyclodisilazane is distilled in vacuum. Yield 28.4 gm. (73%); M.P. 35°; B.P. 100°/12 mm.; $n_D^{20}$ 1.4450.

Analysis.—Calcd. for $C_{12}H_{30}N_2Si_2$. Molecular weight: Calcd. 258.5, found 252.

The cyclodisilazane is found by gas chromatography to be pure.

Calcd. (percent): C, 55.74; H, 11.69; N, 10.84. Found (percent): C, 55.73; H, 11.78; N, 10.76.

EXAMPLE 43

The product of the invention of this example is 1,3-diethyl-diaza-2,4-tetraallyl-disiletidine. To 11.9 g. (0.6 mole) of bis(ethylamino)-diallylsilane in 100 ml. of hexane are slowly added in a nitrogen atmosphere 1.2 mole of butyl lithium in 20 ml. of hexane. The mixture is stirred at ambient temperature for 2 hours. Then, 11.0 g. (0.6 mole) of diallyldichlorosilane are added and the mixture refluxed for 1 hour. The lithium chloride is centrifuged off and upon evaporation of the solvent the liquid residue is fractionally distilled. Yield 75%; B.P. 90°/0.02 mm.; $n_D^{20}$ 1.4877.

Analysis.—Calcd. for $C_{16}H_{30}N_2Si_2$ (percent): C, 62.68; H, 9.86; N, 9.14. (Mol. wt. 306.6.) Found (percent: S, 62.10; H, 9.25; N, 8.63. (Mol. wt. 300.)

EXAMPLE 44

The product of the invention of this example is 1,3-diethyl-diaza-2,4-diethyl-2,4-divinyl-disiletidine. To 10.6 g. (0.06 mole) of bis(ethylamino)-ethyl-vinylsilane (B.P. 83–83.5°/28 mm.; $n_D^{20}$ 1.4399) in 30 ml. of toluene is slowly added in a nitrogen atmosphere 0.12 mole of butyl lithium in 30 ml. of toluene. The mixture is stirred for 1½ hour at ambient temperature. Then, 9.3 g. (0.06 mole) of ethyl-vinyl-dichlorosilane in 10 ml. of toluene are added and the mixture is heated at 100° for 2 hours. Upon evaporation of the solvent the remaining is fractionally distilled. Yield 73%; B.P. 53–54°/0.005 mm., $n_D^{20}$ 1.4638.

Analysis.—Calcd. for $C_{12}H_{26}N_2Si_2$ (percent): C, 56.62; H, 10.30; N, 11.01; Si, 22.07. (Mol. wt. 254.5.) Found (percent): C, 55.99; H, 10.30; N, 10.38. (Mol. wt. 240.)

EXAMPLE 45

The product of the invention of this example is 1,3-dially-diaza-2,4-tetramethyl-disiletidine. To 26.5 g. (0.15 mol) bis(allylamino)-dimethylsilane (B.P. 73°/15 mm.; $n_D^{20}$ 1.4475) in 100 ml. of hexane is slowly added 0.3 mole of butyl lithium in 50 ml. of hexane. The mixture is stirred for 1 hour at ambient temperature. Then, 19.4 g. (0.1 mole) of dimethyl-dichlorosilane in 20 ml. of hexane are added and the mixture is refluxed for 1 hour. Conversion 100%. The purification is accomplished by distillation. Yield 85%; B.P. 74°/11 mm., $n_D^{20}$ 1.4469.

Analysis.—Calcd. for $C_{10}H_{22}N_2Si_2$ (percent): C, 53.03; H, 9.80; N, 12.37. Mol. wt. 226.5.) Found (percent): C, 53.20; H, 9.84; N, 12.50; (Mol. wt. 222.).

EXAMPLE 46

The product of the invention of this example is 1,3-bis(trimethylsilylmethylene)-diaza-2,4-tetramethyl-disiletidine. To 13.1 g. (0.05 mole) of bis(trimethylsilylmethylamino)dimethylsilane (B.P. 112°/16 mm.; $n_D^{20}$ 1.4387) in 50 ml. of hexane is slowly added in a nitrogen atmosphere 0.1 mole of butyl lithium in 20 ml. of hexane with stirring. Then, 6.4 g. (0.05 mole) of dimethyl-dichlorosilane are added and the mixture is refluxed for 2 hours. The lithium chloride is filtered off and the solvent removed in vacuo at 25°. The remaining crystal slurry is purified by sublimation at 50°/0.01 mm. Yield 95%; M.P. 63–640.

The starting $(CH_3)_3SiCH_2NH-Si(CH_3)_2NHC_2Si(CH_3)_3$ is obtained by transamination of $C_2H_5NH-Si(CH_3)_2-NHC_2H_5$ with $(CH_3)_3SiCH_2NH_2$ in a molar ratio of 1:2; B.P. 112/16 mm., $n_D^{20}$ 1.4387.

EXAMPLE 47

The product of the invention of this example is 1,3-diphenyl-diaza-2,4-tetramethyl-disiletidine. To 50.9 gm. (0.21 mole) of bis(anilino)-dimethylsilane in 100 ml. of xylene are added in a nitrogen atmosphere with stirring 70 ml. (0.42 mole) of a 6 N-solution of butyl lithium in hexane and kept at 20–22° for 2 hours. To the suspension of the lithium salt are added dropwise 46 gm. (0.42 mole) of trimethylsilicon chloride and stirred at 130° for 24 hours. The conversion is 58% calculated on the amount of lithium chloride (10.3 gm.) centrifuged off. Yield 35.2 gm. (43.5%).

$(CH_3)_3Si-N(C_6H_5)-Si(CH_3)_2-N(C_6H_5)-Si(CH_3)_3$

B.P. 134–137°/0.15 mm.; $n_D^{20}$ 1.5400.

Analysis.—Calcd. for $C_{20}H_{34}N_2Si_3$ (percent): C, 62.11; H, 8.86; N, 7.24; Si, 21.79. Found (percent): C, 62.65; H, 8.53; N, 7.14; Si, 19.17.

Molecular weight: Calcd. 386.7, found 373.

19.2 gm. (0.05 mole) of the compound obtained above are slowly brought to 340° and refluxed at this temperature for hours. Hexane is added to the cooled reaction mixture and the separated crystals filtered off with suction.

Crude yield 6.8 gm. (92%); M.P. 252.5° (recrystallized in toluene). The compound is identical with those obtained in the Examples 1, 6, 31, 33 and 34.

EXAMPLE 48

This example describes the preparation of 1,3,2,4-pentaphenyl diazaborasiletidine. The di-lithium sale of 22.0 g. (0.06 mole) of $C_6H_5NH-Si(C_6H_5)_2-NHC_6H_5$ is prepared as in Example 35 employing totally 170 ml. of benzene. To the suspension are added at 25° C. with stirring 9.55 g. (0.06 mole) of $B(C_6H_5)Cl_2$ in 50 ml. of hexane and the mixture is refluxed for 2 hours. The lithium chloride is separated by centrifuging. The benzene solution is concentrated by evaporation and after addition of hexane the diazaborasiletidine which crystallizes is filtered off. The compound is recrystallized in cyclohexane under addition of charcoal. Yield 21.5 g. (79%); M.P. 268–270°.

Analysis.—Calcd. for $C_{30}H_{25}N_2SiB$ (percent): C, 79.64; H, 5.67; N, 6.19. Found (percent): C, 79.51; H, 5.72; N, 6.53.

Molecular weight: Calc. 452.5, found 461.

EXAMPLE 49

This example describes the preparation of 1,3,2,4-pentaphenyl diazaphosasiletidine. The di-lithium salt of 22.0 g. (0.06 mole) of $C_6H_5NH-Si(C_6H_5)_2-NHC_6H_5$ is prepared as in Example 35 employing totally 170 ml. of benzene. To the suspension are added 10.7 g. (0.06 mole) of $C_6H_5PCl_2$ in 50 ml. of hexane and the mixture is refluxed for 2 hours. The lithium chloride is separated by centrifuging. The benzene solution is concentrated by evaporation and after addition of hexane the diazaphosphasiletidine which crystallizes is filtered off. The compound is recrystallized in benzene. Yield 27.9 g. (98%); M.P. 212°.

Analysis.—Calcd. for $C_{30}H_{25}N_2SiP$ (percent): C, 76.24; H, 5.33; N, 5.93. Found (percent): C, 76.15; H, 5.35; N, 5.21.

Molecular weight: Calcd. 472.6, found 463.

What is claimed is:

1. A process for preparing heterocyclic 4-membered ring compounds of the formula

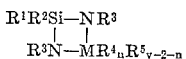

wherein M is selected from the class consisting of silicon, boron, phosphorus, phosphorus oxide and phosphorus sulfide; $R^1$ and $R^2$ each have not more than 24 carbon atoms when taken singly are selected from the class consisting of halogens, hydrocarbons, lower (not more than 8 carbon atoms) dialkylamino-substituted hydrocarbons, halogenated hydrocarbons, hydrocarbons and halogenated hydrocarbons joined by oxygen in ether linkage; $R^4$ having not more than 24 carbon atoms and taken singly is selected from the class consisting of hydrocarbons, lower (not more than 8 carbon atoms) dialkylamino-substituted hydrocarbons, halogenated hydrocarbons, hydrocarbons and halogenated hydrocarbons joined by oxygen in ether linkage; $R^1$ and $R^2$ when taken together form a cyclic polymethylene ring joined through their silicon atom, two $R^4$ groups when taken together form a cyclic polymethylene ring joined through M, $R^3$ has not more than 24 carbon atoms and is selected from the class consisting of hydrocarbons, lower (not more than 8 carbon atoms) dialkylamino-substituted hydrocarbons, halogenated hydrocarbons, hydrocarbons and halogenated hydrocarbons joined by oxygen in ether linkage; $R^5$ taken singly is selected from the class consisting of halogen atoms and the grouping

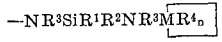

which shows at its end the same 4-membered ring as is shown hereinabove; $R^4$ and $R^5$ when taken together with M form a second 4-membered ring the same as shown above, $n$ is 0 or an integer limited by the valence of M, and $v$ is the valence of M, comprising reacting in an inert solvent a first compound selected from the class consisting of dialkali metal and di-Grignard salts of a N-monosubstituted diorganobis(amino)silane of the formula $R^3NHSiR^1R^2NHR^3$ wherein $R^1$, $R^2$, and $R^3$ are as defined hereinabove, with a second compound of the formula $$X_mMR^4{}_{v-m}$$

wherein $R^{4,m}$ and $v$ are as described hereinabove, X is a halogen atom, and $m$ is an integer of at least 2 limited by $v$.

2. A process of claim 1 wherein M is silicon.

3. A process of claim 1 wherein the ratio of reactants is between about 1 and 2 moles of said first compound per mole of said second compound.

4. A process of claim 1 wherein the reaction is carried out at a temperature above about 70° C.

5. A process of claim 1 wherein the reaction is carried out at a temperature in the range of about 70–150° C.

6. A process for preparing cyclodisilazanes of the general formula

wherein $R^1$ and $R^2$ each have not more than 24 carbon atoms when taken singly are selected from the class consisting of halogens, hydrocarbons, lower (not more than 8 carbon atoms) dialkylamino-substituted hydrocarbons, halogenated hydrocarbons, hydrocarbons and halogenated hydrocarbons joined by oxygen in ether linkage, and $R^1$ and $R^2$ when taken together form a cyclic polymethylene ring joined through silicon; and, $R^3$ has not more than 24 carbon atoms and is selected from the class consisting of hydrocarbons, lower (not more than 8 carbon atoms) dialkylamino-substituted hydrocarbons, halogenated hydrocarbons, hydrocarbons and halogenated hydrocarbons joined through oxygen in ether linkage, and lower (not more than 8 carbon atoms) trialkylsilylmethylenes; comprising heating a silazane of the formula

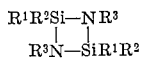

wherein $R^1$, $R^2$ and $R^3$ are as defined hereinabove and Y and Z are defined as follows: Y is a silyl group linked through its silicon atom, having the general formula $SiR^1R^2R^6$ wherein $R^1$ and $R^2$ are as defined hereinabove, and $R^6$ is defined the same as $R^1$, Z is selected from the class consisting of halogen atoms and aminosilane groups linked through its nitrogen atom of the formula $$R^3NSiR^1R^2R^6$$

wherein $R^1$ through $R^3$ and $R^6$ are as defined hereinabove, provided Y and Z are limited to atoms or groups named specifically hereinabove, at a temperature sufficient to split off YZ until no more substantial quantity of YZ is split off.

7. A process of claim 2 wherein a diaminosilane of the formula

wherein $R^1$ through $R^3$ are as defined in claim 2, in the form of a salt selected from the class consisting of dialkali metal and Grignard, is heated with a silicon halide of the formula $R^1{}_nSi(Hal)_{4-n}$ wherein $R^1$ is as specified in claim 2, Hal is a halogen atom, and $n$ is an integer of from 0 to 3, until no more substantial quantity of metal halide formed in the reaction separates, when $n$ is not more than 2, at least two of the halogen atoms of the halide atoms are selected from the class consisting of bromine and chlorine, and a 1:1 molar ratio of reactants are used; until no more substantial quantity of silicon halide released from the bis(halogensilylamino)silane in the reaction can be distilled from the reaction mixture, when an excess of silicon halide is used, when $n$ is not more than two, and at least two of the halogen atoms of the halide are selected from the class consisting of chlorine and bromine atoms; and until no more substantial quantity of the disilylamine released from the bis(silylamino)silane in the reaction can be distilled from the reaction mixture, when using a molar ratio of 1:1 and said silicon halide is selected from the class consisting of silicon monochlorides and silicon monobromide.

8. A process of claim 7 wherein said silicon halide contains 1 to 2 fluorine atoms attached to the silicon.

9. 1,3-diphenyl-diaza-2-dimethyl - 4 - methyl-4-chloro-disiletidine.

10. 1,3-diphenyl-diaza - 2 - dimethyl - 4 - dichloro-disiletidine.

11. 1,3 - bis(trimethylsilylmethylene)-diaza - 2,4-tetra-methyl-disiletidine.

12. 1,3,2,4-pentaphenyldiazaborosiletidine.

13. 1,3,2,4-pentaphenyldiazaphosphasiletidine.

14. A process for preparing cyclodisilazanes of the general formula

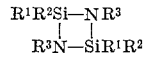

wherein $R^1$ and $R^2$ each have not more than 24 carbon atoms when taken singly are selected from the class consisting of halogens, hydrocarbons, lower (not more than 8 carbon atoms) dialkylamino-substituted hydrocarbons, halogenated hydrocarbons, hydrocarbons and halogenated hydrocarbons joined by oxygen in ether linkage, and $R^1$ and $R^2$ when taken together form a cyclic polymethylene ring joined through silicon; and, $R^3$ has not more than 24 carbon atoms and is selected from the class consisting of hydrocarbons, lower (not more than 8 carbon atoms) dialkylamino-substituted hydrocarbons, halogenated hydrocarbons, hydrocarbons and halogenated hydrocarbons joined through oxygen in ether linkage, and lower (not more than 8 carbon atoms) trialkylsilylmethylenes, comprising heating an organic silicon dihalide of the formula $R^1R^2Si(Hal)_2$ wherein $R^1$ and $R^2$ are as defined hereinabove and Hal is a halogen atom, with a silazine of the formula

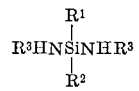

wherein $R^1$, $R^2$ and $R^3$ are as defined hereinabove, at a temperature which gradually rises almost to the boiling point or decomposition point of the cyclodisilazane formed, until no more substantial quantity of the amine released from the diaminosilane can be distilled or sublimed from the reaction mixture.

15. A process for preparing cyclodisilazanes of the general formula

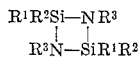

wherein $R^1$ and $R^2$ each have not more than 24 carbon atoms when taken singly are selected from the class consisting of halogens, hydrocarbons, lower (not more than 8 carbon atoms) dialkylamino-substituted hydrocarbons, halogenated hydrocarbons, hydrocarbons and halogenated hydrocarbons joined by oxygen in ether linkage, and $R^1$ and $R^2$ when taken together form a cyclic polymethylene ring joined through silicon; and, $R^3$ has not more than 24 carbon atoms and is selected from the class consisting of hydrocarbons, lower (not more than 8 carbon atoms) dialkylamino-substituted hydrocarbons, halogenated hydrocarbons, hydrocarbons and halogenated hydrocarbons joined through oxygen in ether linkage, and lower (not more than 8 carbon atoms) trialkylsilylmethylenes, comprising heating a cyclosilazane of the formula $$[Si(R^1R^2)NH]_m$$

wherein $m$ is an integer from 3 to 4 and $R^1$ and $R^2$ are as defined hereinabove, with a primary amine of the formula $R^3NH_2$ wherein $R^3$ is defined as hereinabove and which amine can be distilled or sublimed at a temperature sufficient to decompose the cyclosilazane and form a silane of the formula

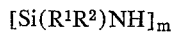

wherein $R^1$, $R^2$ and $R^3$ are as defined hereinabove and the $R^3NH$ groups are identical, in a molar ratio of at least 1:6 or 1:8 of cyclosilazane to amine, until no more substantial quantity of ammonia evolves, at a temperature which gradually rises almost to the boiling point or decomposition point of the cyclodisilazane formed, until no more substantial quantity of the amine released from the diaminosilane can be distilled or sublimed off.

16. A process for preparing cyclodisilazanes of the general formula

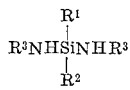

wherein $R^1$ and $R^2$ each have not more than 24 carbon atoms when taken singly are selected from the class consisting of halogens, hydrocarbons, lower (not more than 8 carbon atoms) dialkylamino-substituted hydrocarbons, halogenated hydrocarbons, hydrocarbons and halogenated hydrocarbons joined by oxygen in ether linkage, and $R^1$ and $R^2$ when taken together form a cyclic polymethylene ring joined through silicon; and, $R^3$ has not more than 24 carbon atoms and is selected from the class consisting of hydrocarbons, lower (not more than 8 carbon atoms) dialkylamino-substituted hydrocarbons, halogenated hydrocarbons, hydrocarbons and halogenated hydrocarbons joined through oxygen in ether linkage, and lower (not more than 8 carbon atoms) trialkylsilylmethylenes, comprising heating equimolar qcantities of a symmetric diaminosilane of the formula

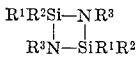

wherein $R^1$, $R^2$ and $R^3$ are as defined hereinabove, and the group $NHR^3$ is derived from a primary amine which can be distilled or sublimed, and a difficulty volatile or non-volatile primary amine of the formula $R^3NH_2$ and $R^3$ is as defined hereinabove at a temperature which gradually rises almost up to the boiling point or decomposition point of the cyclodisilazane, until no more substantial quantity of the amine released from the diaminosilane in the reaction can be distilled or sublimed off from the reaction mixture.

17. A process for preparing cyclodisilazanes of the general formula

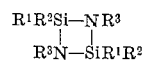

wherein $R^1$ and $R^2$ each have not more than 24 carbon atoms when taken singly are selected from the class consisting of halogens, hydrocarbons, lower (not more than 8 carbon atoms) dialkylamino-substituted hydrocarbons, halogenated hydrocarbons, hydrocarbons and halogenated hydrocarbons joined by oxygen in ether linkage, and $R^1$ and $R^2$ when taken together form a cyclic polymethylene ring joined through silicon; and, $R^3$ has not more than 24 carbon atoms and is selected from the class consisting of hydrocarbons, lower (not more than 8 carbon atoms) dialkylamino-substituted hydrocarbons, halogenated hydrocarbons, hydrocarbons and halogenated hydrocarbons joined through oxygen in ether linkage, and lower (not more than 8 carbon atoms) trialkylsilylmethylenes, comprising heating a primary amine of the formula $R^3NH_2$ wherein $R^3$ is as defined hereinabove in the form of a salt selected from the class consisting of dialkali and di-Grignard, with a silicon halide of the formula $$R^1{}_nSi(Hal)_{4-n}$$

wherein $R^1$ is as defined hereinabove, Hal is a halogen atom, and $n$ is an integer of from 0 to 2, at elevated temperatures in an inert solvent, until no more substantial quantity of metal halide formed in the reaction separates when equimolar quantities of reactants are used, and when using excess silicon dihalide until no more substantial quantity of silicon halide released from the disilylamine in the reaction mixture can be distilled from the reaction mixture.

18. A process of claim 6 wherein the silazane is a symmetric disilylamine of the formula

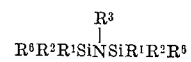

wherein $R^1$ through $R^3$ and $R^6$ are as defined in claim 6 and each silyl group has at least one atom selected from the class consisting of chlorine and bromine atoms linked to the silicon atom.

19. A process of claim 6 comprising heating an unsymmetrical disilylamine of the formula

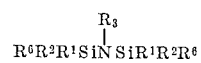

wherein $R^1$ through $R^3$ and $R^6$ are defined as in claim 6 with the silyl groups being different and one silyl group containing at least one halogen atom selected from the class consisting of chlorine and bromine atoms linked to the silicon atom.

20. A process for preparing cyclodisilazanes of the general formula

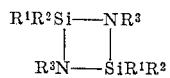

wherein $R^1$ and $R^2$ each have not more than 24 carbon atoms when taken singly are selected from the class consisting of halogens, hydrocarbons, lower (not more than 8 carbon atoms) dialkylamino-substituted hydrocarbons, halogenated hydrocarbons, hydrocarbons and halogenated hydrocarbons joined by oxygen in ether linkage, and $R^1$ and $R^2$ when taken together form a cyclic polymethylene ring joined through silicon; and, $R^3$ has not more than 24 carbon atoms and is selected from the class consisting of hydrocarbons, lower(not more than 8 carbon atoms) dialkylamino-substituted hydrocarbons, halogenated hydrocarbons, hydrocarbons and halogenated hydrocarbons joined through oxygen in ether linkage, and lower (not more than 8 carbon atoms) trialkylsilylmethylenes, comprising heating a silylamine of the formula $$R^3HNSiR^1R^2R^6$$

in the form of a salt selected from the class consisting of alkali metal and Grignard, and wherein $R^1$ through $R^3$ are defined as hereinabove and $R^6$ is defined the same as $R^1$, with a silicon halide of the formula $R^1_n Si(Hal)_{4-n}$ wherein $R^1$ is as defined hereinabove, $n$ is an integer from 1 to 2 and Hal is a halogen atom, until no more substantial quantity of silicon halide released from the disilylamine in the reaction can be distilled from the reaction mixture.

References Cited

UNITED STATES PATENTS

| | | | |
|---|---|---|---|
| 2,832,794 | 4/1958 | Gordon | 260—448.2 |
| 2,842,522 | 7/1958 | Frye | 260—448.2X |
| 3,140,288 | 7/1964 | Peake | 260—448.2X |

HELEN M. McCARTHY, Primary Examiner

W. F. W. BELLAMY, Assistant Examiner

U.S. Cl. X.R.

252—397, 9